Patented June 26, 1951

2,557,924

UNITED STATES PATENT OFFICE 2,557,924

MANUFACTURE OF ESTERS OF HYDRAZOIC ACID

Raymond E. Schaad, Riverside, Ill., assignor to Universal Oil Products Company, Chicago, Ill., a corporation of Delaware No Drawing. Application February 6, 1948, Serial No. 6,817

10 Claims. (Cl. 260—349)

This invention relates to a process for manufacturing esters of hydrazoic acid and particularly for manufacturing alkyl azides in which the alkyl group contains at least two carbon atoms.

An object of this invention is the production of an ester of hydrazoic acid.

Another object of this invention is to produce an alkyl ester of hydrazoic acid in which the alkyl group contains at least two carbon atoms.

One specific embodiment of this invention relates to a process for producing an alkyl azide having at least two carbon atoms per molecule which comprises reacting an olefinic hydrocarbon and hydrazoic acid in the presence of an acid-acting catalyst.

Another embodiment of this invention relates to a process for producing an alkyl azide having at least two carbon atoms per molecule which comprises reacting an olefinic hydrocarbon and hydrazoic acid in the presence of a mineral acid catalyst.

A further embodiment of this invention relates to a process for producing an alkyl azide having at least two carbon atoms per molecule which comprises reacting an olefinic hydrocarbon and hydrazoic acid in the presence of a sulfuric acid catalyst.

A still further embodiment of this invention relates to a process for producing an alkyl azide having at least two carbon atoms per molecule which comprises reacting an olefinic hydrocarbon and hydrazoic acid in the presence of a hydrogen fluoride catalyst.

It is known that certain alkyl azides are useful as explosives and also as material suitable for adding to Diesel fuels to improve their burning characteristics commonly referred to in terms of their cetane numbers. It is also known that certain alkyl azides may be formed by interacting an alkyl halide or alkyl sulfate with an azide of an alkali metal such as sodium azide.

According to the method of this invention, an alkyl azide is formed by reacting an olefinic hydrocarbon with hydrazoic acid in the presence of an acid-acting catalyst.

Olefinic hydrocarbons utilizable in forming alkyl azides comprise monoolefins and polyolefins. Suitable monoolefins include the aliphatic monoolefins or alkenes comprising ethylene, propylene, butylenes, pentenes, hexenes and higher boiling normally liquid aliphatic olefins, the latter including various polymers of normally gaseous olefins. Cyclic olefins including cyclopentene, alkylcyclopentenes, cyclohexene, alkylcyclohexenes, and the like may also be charged in this process to form cycloalkylazides. Arylalkenes such as styrene, α-methylstyrene, etc., and also cycloalkylalkenes may also be charged in this process. Typical polyolefins which may be used in this process include conjugated diolefins, such as butadiene-1,3 and isoprene and also nonconjugated diolefins and other polyolefins.

Catalysts suitable for promoting the process of the present invention are acid-acting materials including mineral acids, and acid-acting salts. Suitable mineral acid catalysts include sulfuric acid, chlorosulfonic acid, fluorosulfonic acid, hydrogen fluoride, hydroxy borofluoric acids, fluorophosphoric acids, and phosphoric acids. These phosphoric acid catalysts comprise ortho phosphoric acid, and also polyphosphoric acids such as pyrophosphoric acid, triphosphoric acid, and tetraphosphoric acid. In some cases, boron trifluoride and its complexes with water, an alcohol, an ether, or an ester or a carboxylic acid may be used to catalyze the process.

Acid-acting salts which may be used to catalyze this process include certain phosphates and acid phosphates of metals selected from the members of the right-hand column of group I and the members of group II of the periodic table, particularly phosphates of copper, silver, zinc, cadmium, mercury and the alkaline earth metals calcium, strontium and barium. Under certain conditions granular solid acid-acting catalysts including solid phosphoric acid catalysts and acid-acting oxide-type materials such as activated clays, composites of silica and alumina, silica, alumina and zirconia, and alumina and zirconia may be used. The solid phosphoric acid catalysts are formed by calcining composites of a phosphoric acid and a siliceous adsorbent such as diatomaceous earth, synthetically prepared silica, clays, etc.

Hydrazoic acid is a colorless liquid with a normal boiling point of 37° C. and a melting point of —87° C. At a temperature of 25° C. hydrazoic acid has an ionization constant of $1.9 \times 10^{-5}$. Hydrazoic acid may be prepared by a number of methods including the oxidation of hydrazine sulfate by potassium persulfate. Also a hot solution of molecular proportions of hydroxylamine and hydrazine in dilute sulfuric acid is oxidized by slow addition of permanganate, bromine, red lead, lead dioxide, hydrogen peroxide or chromic acid and the resultant hydrazoic acid is separated from the reaction mixture by distillation. In another method of preparing hydrazoic acid, a current of nitrous oxide, $N_2O$, is passed over sodium amide at a temperature of about 190° C. to produce sodium azide according to the equation:

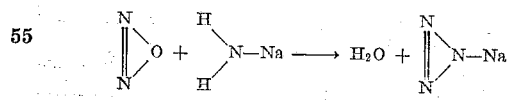

The reaction product of the treatment of sodium amide with nitrous oxide is a mixture of sodium hydroxide and sodium azide, which is then dissolved in water, the solution is acidified with dilute sulfuric acid and distilled to recover the hydrazoic acid.

This process is carried out by reacting hydrazoic acid and an olefin in the presence of an acid-acting catalyst at a temperature of from about 0° to about 200° C. and at a pressure of from substantially atmospheric to about 100 atmospheres. This process is carried out in either batch or continuous type of operation. In batch type of operation, the usual procedure consists in placing a mineral acid catalyst in a reactor provided with a mechanically driven stirrer and a suitable cooling or heating jacket, and then adding thereto slow streams of an olefinic hydrocarbon and of hydrazoic acid, the latter introduced as vapor, liquid, or as a solution of liquid hydrazoic acid in a suitable solvent such as water. Sometimes it is also advantageous to have a diluent present in the reactor in order to facilitate control of the reaction. Suitable diluents include saturated hydrocarbons of such boiling range that they may be separated readily from the reaction products, or the diluent may consist of a fluoro-carbon or other liquid which is substantially inert at the operating conditions necessary for the process.

This process may be carried out in a continuous manner by passing about one to about ten molecular proportions of olefinic hydrocarbon and one molecular proportion of hydrazoic acid through a reactor containing a suitable solid catalyst such as solid phosphoric acid catalyst, a phosphate of a metal, or a solid acid-acting oxide catalyst such as silica-alumina maintained at the desired operating temperature. When using a solid catalyst the operating temperature is preferably from about 75° C. to about 200° C. The reaction products withdrawn from the exit of such a continuous reactor are then directed to suitable separating and distilling equipment in order to recover unconverted olefinic hydrocarbon and hydrazoic acid which may be recycled to the process, and to isolate the desired alkyl azide formed in the process.

The following example is given to illustrate the character of the results of this process but with no intention of limiting unduly the generally broad scope of the invention.

Two molecular proportions of propylene and one molecular proportion of hydrogen azide are reacted in the presence of solid phosphoric acid catalyst in a steel reactor maintained at a temperature of 150° C. and at substantially atmospheric pressure. By this treatment a portion of the propylene reacts with hydrogen azide to form isopropyl azide which is recovered by fractional distillation of the resultant reaction mixture.

I claim as my invention:

1. A process for producing an alkyl azide having at least two carbon atoms per molecule which comprises reacting an unsaturated hydrocarbon of the formula $RCH=CH_2$, wherein R is an alkyl radical, and hydrazoic acid in the presence of an acid-acting catalyst.

2. A process for producing an alkyl azide having at least two carbon atoms per molecule which comprises reacting an olefinic hydrocarbon of the formula $RCH=CH_2$, wherein R is an alkyl radical, and hydrazoic acid in the presence of a mineral acid catalyst.

3. A process for producing an alkyl azide having at least two carbon atoms per molecule which comprises reacting an olefinic hydrocarbon of the formula $RCH=CH_2$, wherein R is an alkyl radical, and hydrazoic acid in the presence of a sulfuric acid catalyst.

4. A process for producing an alkyl azide having at least two carbon atoms per molecule which comprises reacting an olefinic hydrocarbon of the formula $RCH=CH_2$, wherein R is an alkyl radical, and hydrazoic acid in the presence of a hydrogen fluoride catalyst.

5. A process for producing an alkyl azide having at least two carbon atoms per molecule which comprises reacting an olefinic hydrocarbon of the formula $RCH=CH_2$, wherein R is an alkyl radical, and hydrazoic acid in the presence of a calcined composite of a phosphoric acid and a siliceous adsorbent.

6. A process for producing an ester of hydrazoic acid having at least two carbon atoms per molecule which comprises reacting an olefinic hydrocarbon of the formula $RCH=CH_2$, wherein R is an alkyl radical, and hydrazoic acid in the presence of an acid-acting catalyst at a temperature of from about 0° to about 200° C.

7. A process for producing an alkyl azide having at least two carbon atoms per molecule which comprises reacting an unsaturated hydrocarbon of the formula $RCH=CH_2$, wherein R is an alkyl radical, and hydrazoic acid in the presence of a mineral acid catalyst at a temperature of from about 0° to about 200° C.

8. A process for producing an alkyl azide having at least two carbon atoms per molecule which comprises reacting an olefinic hydrocarbon of the formula $RCH=CH_2$, wherein R is an alkyl radical, and hydrazoic acid in the presence of a sulfuric acid catalyst at a temperature of from about 0° to about 200° C.

9. A process for producing an alkyl azide having at least two carbon atoms per molecule which comprises reacting an olefinic hydrocarbon of the formula $RCH=CH_2$, wherein R is an alkyl radical, and hydrazoic acid in the presence of a calcined composite of a phosphoric acid and a siliceous adsorbent at a temperature of from about 75° to about 200° C.

10. A process for producing an alkyl azide having at least two carbon atoms per molecule which comprises reacting from about one to about ten molecular proportions of propylene and one molecular proportion of hydrazoic acid at a temperature of from about 75° to about 200° C. and at a pressure of from substantially atmospheric to about 100 atmospheres in the presence of a calcined composite of a phosphoric acid and a siliceous adsorbent.

RAYMOND E. SCHAAD.

REFERENCES CITED

The following references are of record in the file of this patent:

UNITED STATES PATENTS

| Number | Name | Date |
| --- | --- | --- |
| 1,564,631 | Schmidt | Dec. 8, 1925 |

OTHER REFERENCES

Oliveri-Mandala et al.: Gazzetta chim. italiana, vol. 43, pt. I, pp. 304–315 (1913).

Chemical Abstracts, vol. 7, page 2934 (1913).

Schmidt: Ber. deutsch. chem. Ges., vol. 57, pp. 704–706 (1924).

Briggs et al.: Jour. Chem. Soc. (London), vol., 1942, pp. 61 to 63.